US005587044A

United States Patent [19]

Goto

[11] Patent Number: 5,587,044

[45] Date of Patent: Dec. 24, 1996

[54] LABEL CASSETTE RETAINING DEVICE FOR LABELER

[75] Inventor: Fumio Goto, Iwate-ken, Japan

[73] Assignee: Kabushiki Kaisha Sato, Japan

[21] Appl. No.: 225,052

[22] Filed: Apr. 8, 1994

Related U.S. Application Data

[63] Continuation-in-part of Ser. No. 133,624, Oct. 8, 1993, Pat. No. 5,403,431.

[30] Foreign Application Priority Data

Oct. 18, 1992 [JP] Japan .................................... 4-75906
Mar. 10, 1994 [JP] Japan .................................... 6-003376

[51] Int. Cl.$^{6}$ .................................... B32B 31/00

[52] U.S. Cl. ......................... 156/577; 156/542; 156/579; 242/578

[58] Field of Search .................................... 156/523, 524, 156/526, 527, 574, 576, 577, 579, 542; 242/578, 916

[56] References Cited

U.S. PATENT DOCUMENTS 1,773,153 8/1930 Remnsnider ............................ 242/578
4,436,573 3/1984 Sato et al. ............................... 156/384
5,269,871 12/1993 Longworth et al. ................ 156/579 X

*Primary Examiner*—James Engel
*Attorney, Agent, or Firm*—Ostrolenk, Faber, Gerb & Soffen

[57] ABSTRACT

The invention provides a label cassette retaining device for a labeler constituted as a combination of a labeler unit and a label cassette loadable in the labeler unit and being equipped with a label lateral restriction section operable by a grip. The retaining device comprises a first engagement means provided at the forward end of the labeler unit and the label cassette, a second engagement means provided at the rearward end thereof, and a third engagement means constituted by the grip and a slotted engagement section provided on the labeler unit.

6 Claims, 5 Drawing Sheets

LABEL CASSETTE RETAINING DEVICE FOR LABELER

CROSS REFERENCE TO RELATED APPLICATIONS

This is a continuation-in-part of application Ser. No. 08/133,624 filed Oct. 8, 1993 now U.S. Pat. No. 5,403,431.

BACKGROUND OF THE INVENTION

1. Field of the Invention

This invention relates to a label cassette retaining device for a labeler used for manually applying labels to objects.

2. Description of the Prior Art

The assignee's U.S. Pat. No. 4,436,573 teaches a configuration enabling label cassettes to be loaded into and unloaded from a labeler of this type.

The label cassette and main labeler unit combination according to this patent is designed such that when an operating lever of the main labeler unit is squeezed and released, conveyance claws provided at the bottom of the main labeler unit and engaged with the feed flaps of a backing strip having labels provisionally attached thereon are reciprocated for feeding the backing strip. The backing strip is turned back sharply near the forward end of the label cassette so that a single label is peeled off the backing strip with each reciprocation. The peeled-off label can then be applied to an object.

However, when the labeler is handled roughly, as during rapid labeling, the label cassette loaded in the main labeler unit is liable to fall out.

For preventing this problem, the prior art labeler is provided at the forward end of the main labeler unit and the label cassette with a first engagement means comprised of projections and recesses and at the rearward end thereof with second engagement means constituted as a lock mechanism.

Despite the provision of the first and second engagement means, however, the label cassette is nevertheless apt to fall out of the main labeler unit during rapid labeling operations conducted using a wide, and therefore heavy, label roll.

In addition, when labeling is continued over a long period using a wide, heavy label roll, the restraint on the label roll in the widthwise (lateral) direction tends to loosen. When this happens, the label roll not only loses it shape but also moves laterally along its spool. This may cause the labels to loosen or be damaged.

SUMMARY OF THE INVENTION

One object of the present invention is to provide a label cassette retaining device for a labeler which is able to prevent a label cassette from falling out of a labeler.

Another object of this invention is to provide a label cassette retaining device for a labeler which enables the lateral position of a label roll to be securely restrained.

For achieving these objects, the invention provides a label cassette retaining device for a labeler constituted as a combination of a labeler unit and a label cassette loadable in the labeler unit and being equipped with a label lateral restriction section operable by a grip, the device comprising a first engagement means provided at the forward end of the labeler unit and the label cassette, a second engagement means provided at the rearward end thereof, and a third engagement means constituted by the grip and a slotted engagement section provided on the labeler unit.

When the label cassette is to be loaded in the cassette loading section of the labeler unit, it is inserted from its forward end so as to engage the two units by the first engagement means, specifically by engaging the projections on the label cassette side with the recesses on the labeler unit side. Simultaneously with this engagement of the first engagement means, engagement is also established by means of the third engagement means that characterizes this invention. Specifically, the grip of the label lateral restriction section on the label cassette side is engaged with one of the slots on the labeler unit side.

The grip is used for restricting the lateral position of a roll of label strip T. Specifically, it is used to move a retaining plate laterally so as to securely restrain the side of the label roll in the label cassette.

When the label cassette is engaged only at the first and third engagement means at its forward end, its rear end sticks up slightly. The rear section of the label cassette is therefore pressed down with the fingers to engage the two units by the second engagement means. This engagement is achieved by an arm engagement member on the label cassette side engaging with a spring-biased lock member on the labeler unit side. Specifically, an engaging tip of the label cassette engages with an engaging tip of a lock member.

When the label cassette is to be removed from the labeler unit, the second engagement means is released first by sliding a lock button forward relative to the labeler unit with the thumb. When the label cassette is thereafter lifted by hand, both the first engagement means and the third engagement means disengage, making complete removal of the label cassette possible.

DETAILED DESCRIPTION OF THE PREFERRED EMBODIMENT

Figure 1:
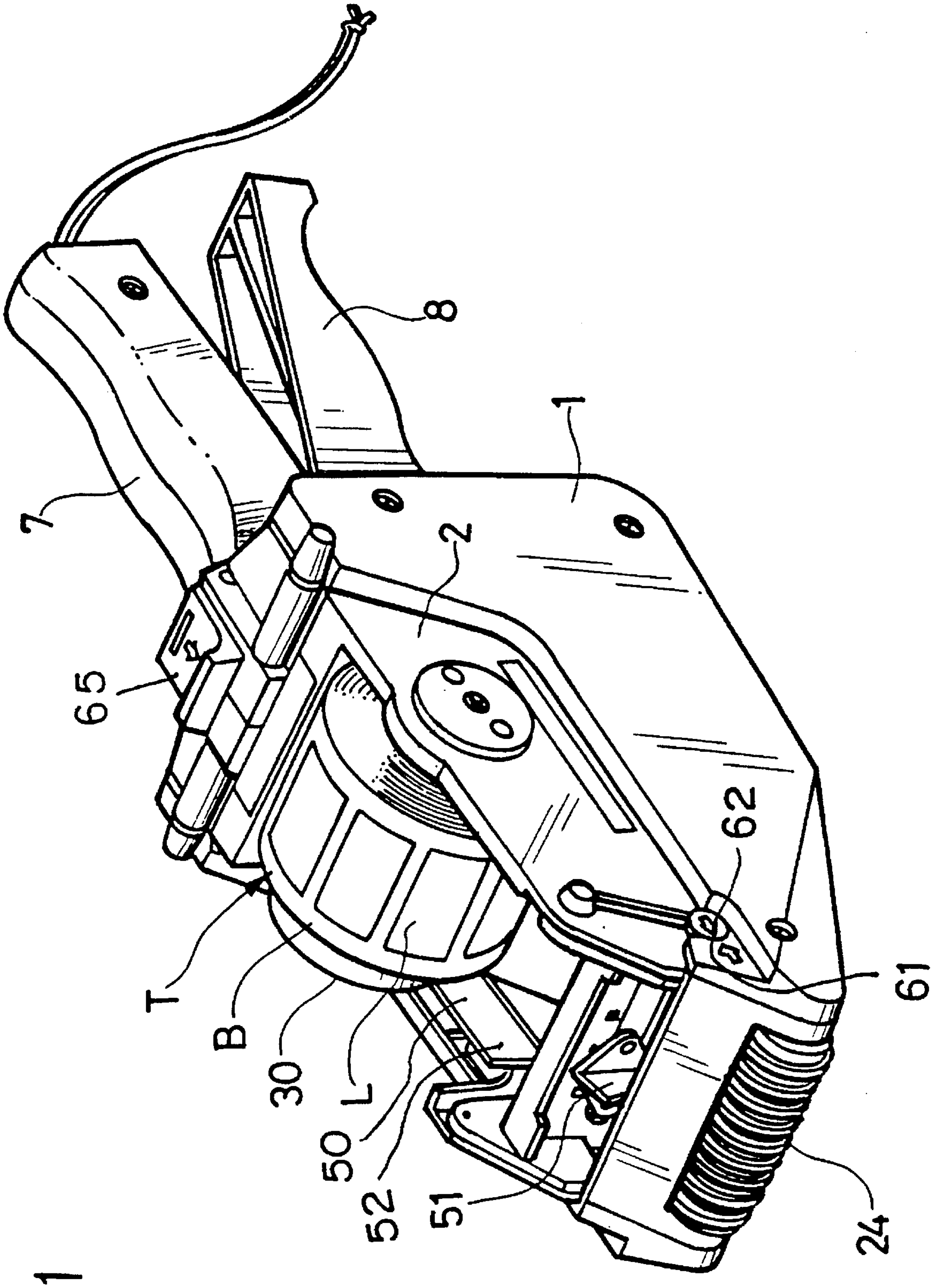
FIG. 1 is a perspective view of a labeler unit loaded with a label cassette to constitute a labeler provided with the retaining device according to the invention.
Figure 2:
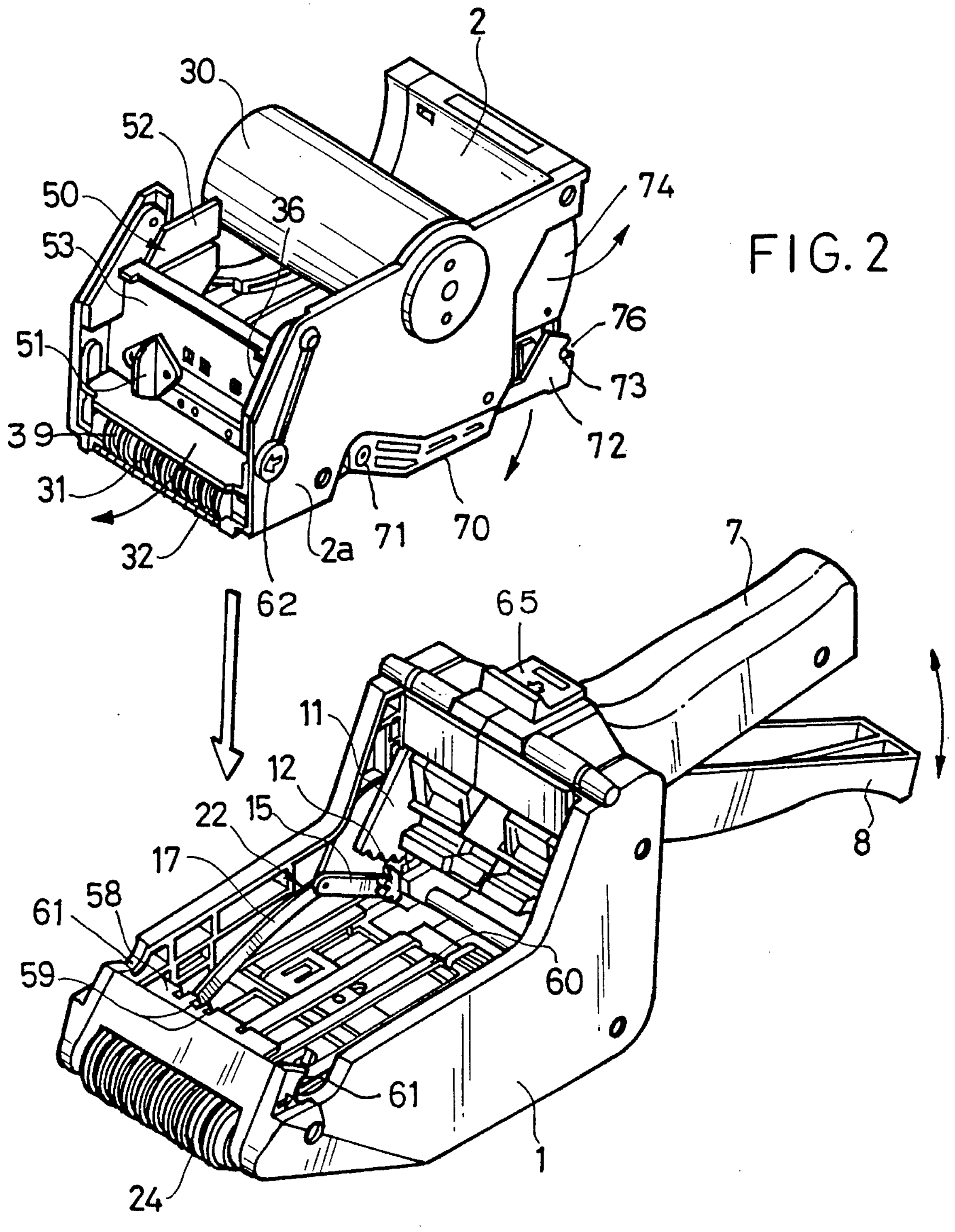
FIG. 2 is a perspective view of the labeler unit of FIG. 1 showing the labeler unit and the label cassette in their separated state.

As shown in the overall perspective views of FIGS. 1 and 2, the labeler consists of a labeler unit 1 and a label cassette 2 loaded into the labeler unit 1. The label cassette 2 comprises a spool 30 for holding a roll of continuous label strip T consisting of a number of preprinted labels L provisionally attached at regular intervals to a backing strip B. When an operating lever 8 of the labeler unit 1 is squeezed in the direction of a grip 7 thereof, one of the labels L is peeled off the backing strip B and made ready for attachment to the object to be labeled.

The roll of continuous label strip T is available in different types in which the labels L provisionally attached to the backing strip B are of different length. The labeler unit 1 is provided with the label feed pitch change over mechanism so as to be able to use the different types of continuous label strip T. When the continuous label strip T is changed from one type to another, the label feed pitch change-over mechanism is operated to change the label feed pitch to that suitable for the pitch of the labels of the new continuous label strip T.

Figure 3:
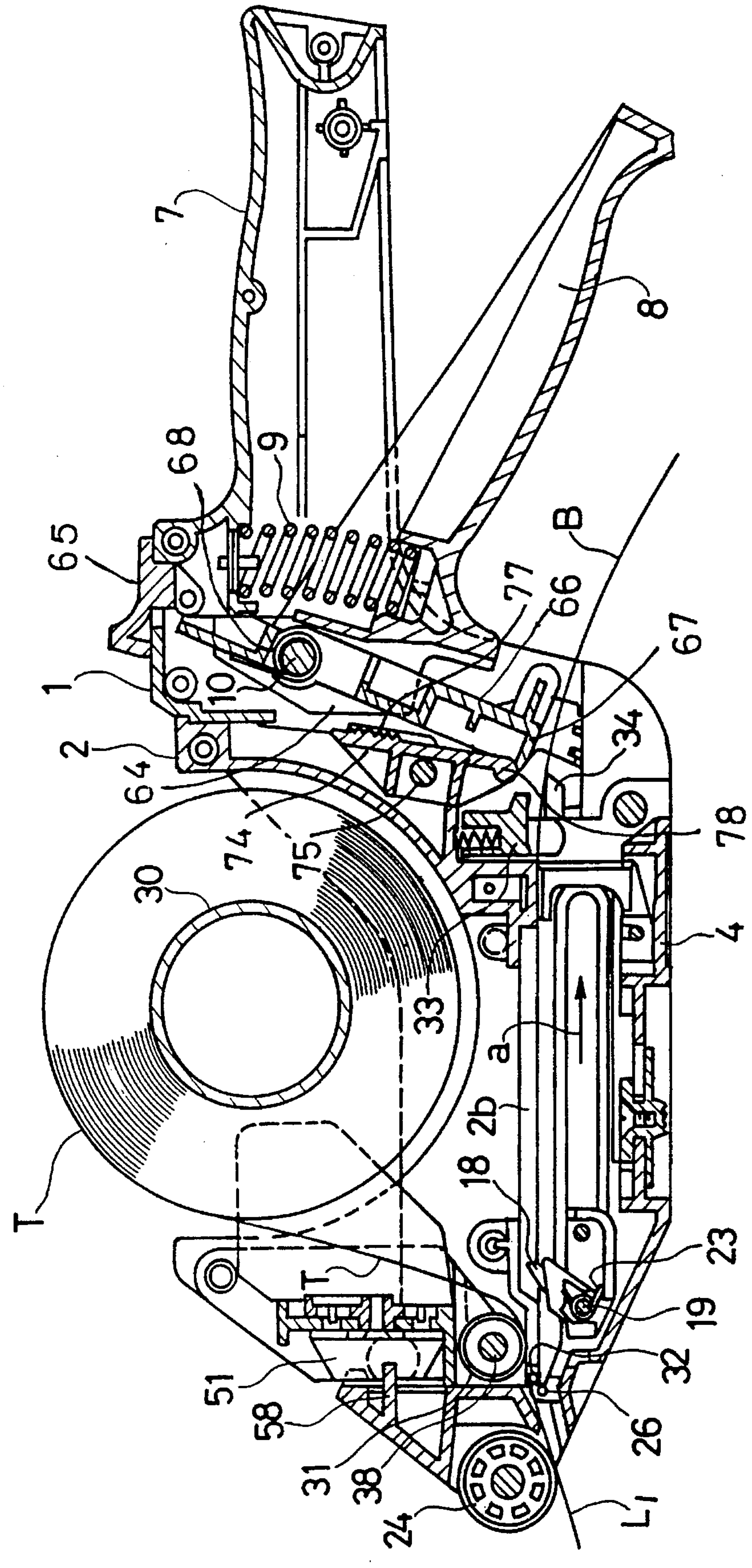
FIG. 3 is a sectional view of the labeler of FIG. 1.

FIG. 3 shows a side sectional view of the labeler unit loaded with a label cassette 2 having a roll of continuous label strip T on its spool 30.

The tip of the continuous label strip T is paid out from the label cassette 2 and passed under a presser roller 31 and to a deflection pin 32 provided in the label cassette 2, where the backing strip B is turned sharply back for peeling off the labels L. On the other hand, the backing strip B from which the labels L have been peeled is drawn in the direction of the arrow a by claws 18. As will be explained later, on the return stroke the claws 18 disengage from the backing strip B and move in the opposite direction from the arrow a to resume their initial positions.

Referring also to FIG. 2, the reciprocal motion of the claws 18 is produced via geared arms 11, sector gears 12 and a claw reciprocator 22 by squeezing the operating lever 8 toward the grip 7 against the force of a spring 9 and by releasing the operating lever 8 to allow the spring 9 to return it to its normal position.

Returning to FIG. 3, each claw 18 is further biased by a coil spring 23 would about a shaft 19. Thus after the claws have engaged with the food flape of the backing strip B and drawn the backing strip B a prescribed distance (the label feed pitch), the action of the coil springs 23 enables the claws 18 to disengage from the feed flaps and, while maintaining a light pressure on the undersurface of the backing strip B, to return to their original positions for engagement with the next pair of feed flaps.

The label cassette retaining device of the labeler according to this invention will now be explained with reference to FIGS. 2 to 6.

As in the prior art labeler, first engagement means and a second engagement means are provided between the labeler unit 1 and the label cassette 2. As shown in the perspective exploded view of FIG. 2, the first engagement means consists of a pair of recesses 61 formed on the opposite sides near the forward end of the labeler unit 1 and a pair of projections 62 formed on the opposite sides near the forward end of the label cassette 2. The projections 62 fit into the recesses 61 when the label cassette 2 is loaded in the labeler unit 1.

As designated by reference numeral 64 and shown best in the sectional view of the labeler unit 1 and the label cassette 2 in FIG. 3, the second engagement means is provided at the rear end of these two units. Specifically, it comprises a lock button 65 provided on the labeler unit 1 and a lock member 66 rotatably mounted on the pivot shaft 10 of the labeler unit 1 and linked with the lock member 66 to rotate about the pivot shaft 10 with the movement of the lock button 65. A spring 68 is provided on the pivot shaft 10 to constantly bias an engaging tip 67 at the distal end of the lock member 66 clockwise into engagement with the label cassette 2.

As shown best in FIG. 2, a pair of backing strip presser arms 70 (only one shown) mounted to be pivotable about shafts 71 (only one shown) are provided toward the rear of the label cassette 2. The rearward end of each backing strip presser arm 70 is formed with an engagement member 72 whose engagement recess 70 engages with an engaging tip 76 of an arm engagement member 74. The arm engagement members 74 engages with the aforesaid lock member 66.

As shown best in FIG. 3, the arm engagement member 74 is rotatably mounted on a shaft 75 and is urged clockwise by a spring 77 and the engaging tip 67 of the lock member 66 engages with an engaging tip 78 of the arm engagement member 74.

The engagement by the second engagement means 64 can be released by pushing the lock button 65 forward. This causes the lock member 66 linked with the lock button 65 to disengage from the arm engagement member 74 of the label cassette 2 and frees the label cassette 2 within the labeler unit 1. The labeler unit 1 can then be easily removed by hand.

The device according to this invention is characterized by a third engagement means provided in addition to the first and second engagement means for engaging the label cassette 2 with the labeler unit 1. The third engagement means will now be explained with reference to FIGS. 3 to 6, beginning with a description of the configuration according to the prior art.

Figure 4:
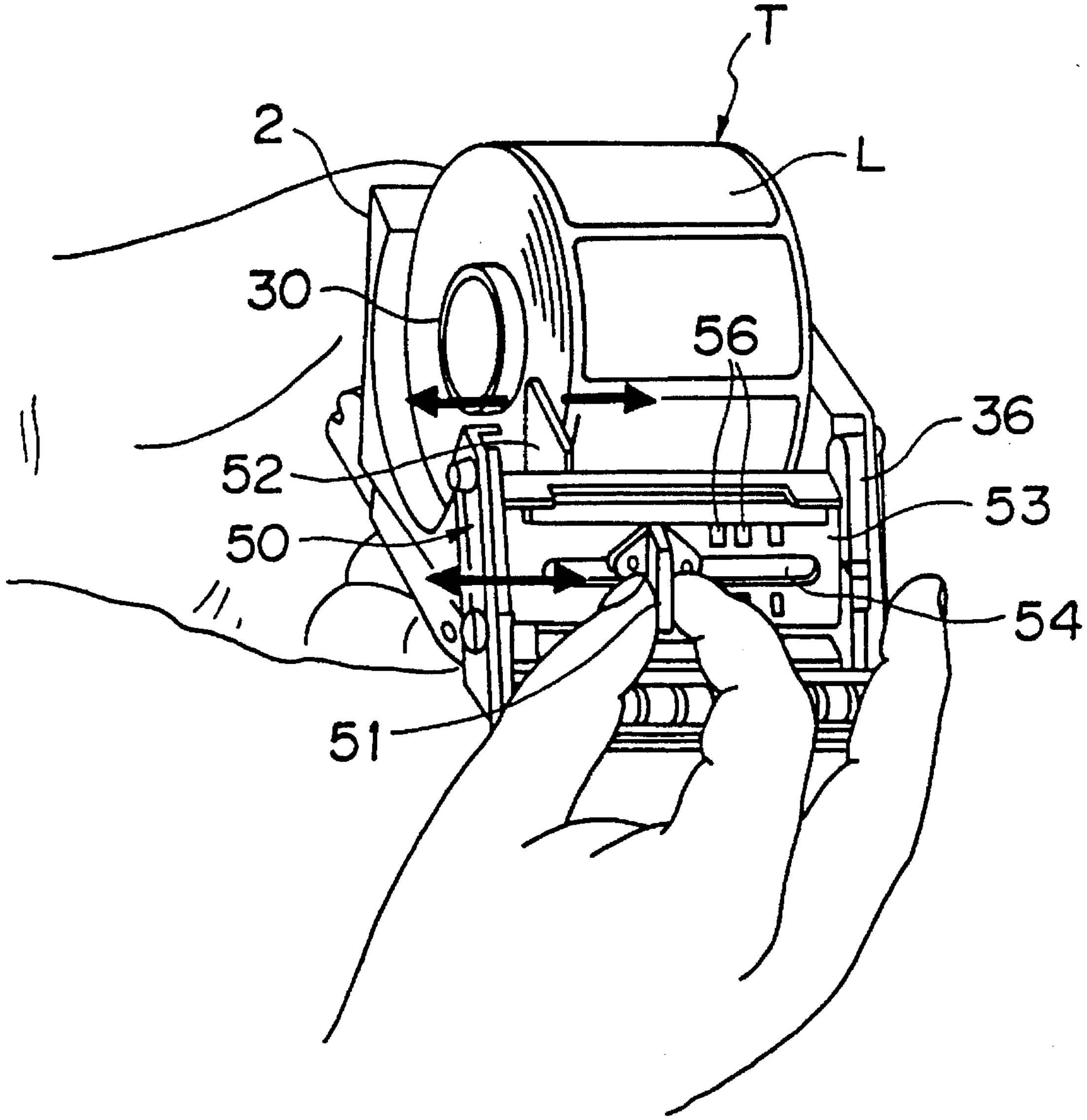
FIG. 4 is an overall perspective view of the label cassette of the labeler of FIG. 1 showing how a label lateral restriction section for restraining lateral movement of the roll of continuous label strip is operated, the grip of this section also serving as a member of the third engagement means according to the invention.

As best shown in FIG. 4, the label cassette 2 is provided at its forward end with a label lateral restriction section 50 which comprises a retainer plate 52 linked with a grip 51 slidable along a guide slot 64 in a dial 53 of a rotary label presser section 36 for restraining the side surface of the roll of continuous label strip T.

Figure 5:
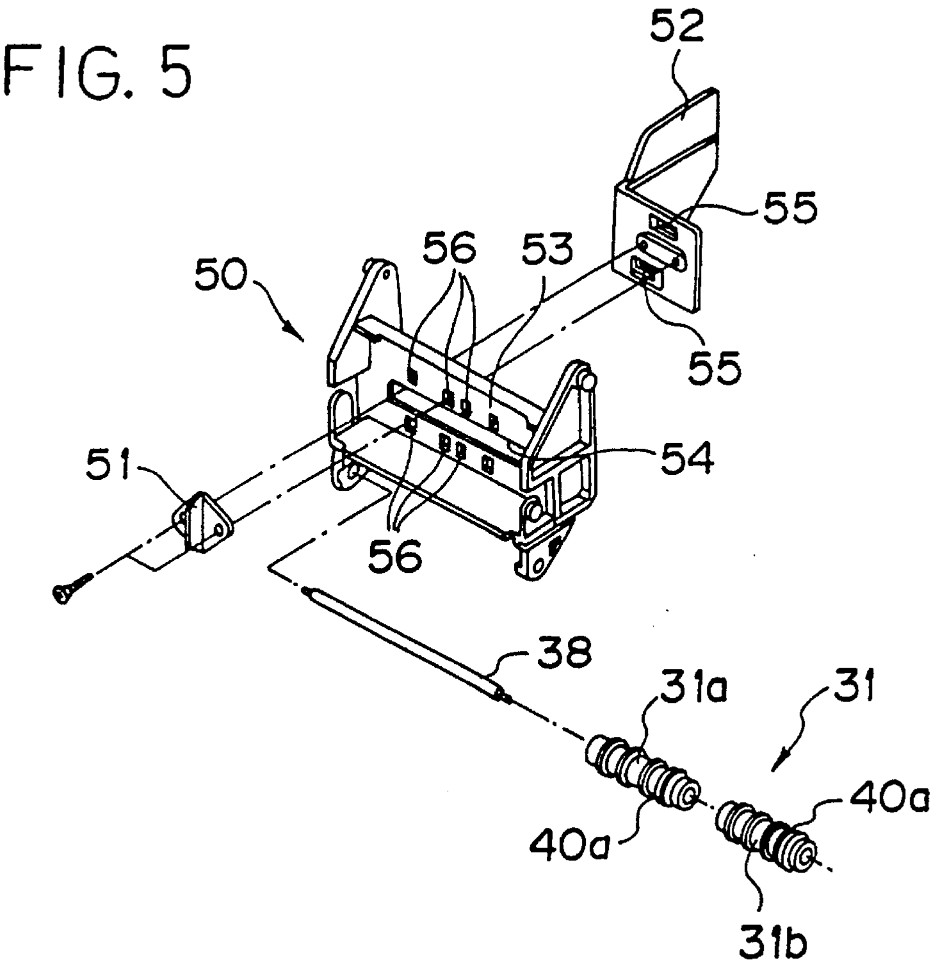
FIG. 5 is an exploded perspective view of the label roll retainer.

As shown in FIG. 5, the grip 51, and accordingly the retainer plate 52, are held in the selected position by engagement of elastic projections 55 on the retainer plate 52 with one of a plurality of pairs of engagement holes 56.

The retainer plate 52 and the elastic projections 55 thereon are integrally molded of synthetic resin. Three pairs or engagement holes 56 are provided, one each for restricting 48 mm, 40 mm and 36 mm wide rolls. The members of each pair are vertically aligned above and below the guide slit 54.

Thus, as shown in FIG. 4, when a 48 mm wide roll is to be restricted, for example, the label roll is first inserted over the spool 30 and the grip 51 is then moved into the proper position for restricting the side of the roll.

In this prior art configuration, the grip 51 is held in place only by a single pair of vertically spaced plastic projections 55 engaged with a pair of vertically spaced engagement holes 56. Because of this, the engagement means are liable to disengage when the labeler is handled roughly during labeling.

Figure 6:
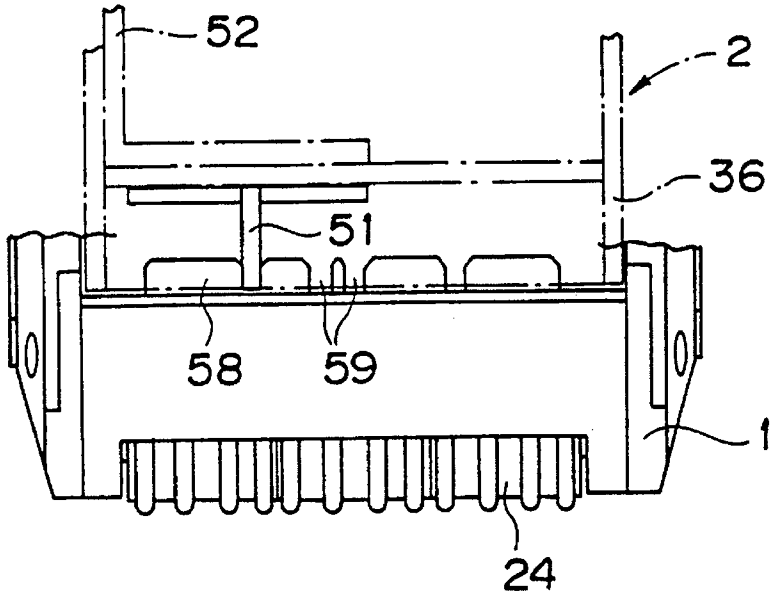
FIG. 6 is a plan view of an essential portion of the retaining device according to the invention, showing how a grip on the label cassette side engages with a slotted engagement section on the labeler unit side.

As shown in FIGS. 2 and 6, the retaining device according to the invention is additionally equipped with an engagement section 58 at the forward end of the label cassette 2 loading section 60. The engagement section 58 is formed with vertical slots 59 and the tip of the grip 51 is adapted to engage with a selected one of the slots 59.

Once the grip 51 for restricting the label roll laterally has been engaged with one of the slots 59 of the engagement section 58, it can be securely retained at the proper width defining position even when the labeler is used in a rough manner.

As in the case of the plastic projections 55 and the engagement holes 56 described earlier, the slots 59 are formed at three positions for rolls measuring 48 mm, 40 mm and 36 mm in width.

The operations for loading and unloading the label cassette 2 in and from of the labeler unit 1 will be now be explained.

When the label cassette 2 is to be loaded in the cassette loading section 60 of the labeler unit 1, it is inserted from its forward end so as to engage the two units by the first engagement means, specifically by engaging the projections 62 on the label cassette 2 side with the recesses 61 on the labeler unit 1 side. Simultaneously with this engagement of the first engagement means, engagement is also established by means of the third engagement means according to this invention. Specifically, the grip 51 of the label lateral restriction section 50 on the label cassette 2 side is engaged with one of the slots 59 on the labeler unit 1 side.

The grip 51 is used for restraining the lateral position of a roll of label strip T. Specifically, it is used to move the retaining plate 52 laterally so as to securely restrain the side of the label roll.

When the label cassette 2 is engaged only at the first and third engagement means at its forward end, its rear end sticks up slightly. The rear section of the label cassette 2 is therefore pressed down with the fingers to engage the two units by the second engagement means. This engagement is achieved by the arm engagement member 74 on the label cassette 2 side engaging with the spring-biased lock member 66 on the labeler unit 1 side. Specifically, the engaging tip 78 of the label cassette 2 engages with the engaging tip 67 of the lock member 66.

When the label cassette 2 is to be removed from the labeler unit 1, the second engagement means (66, 74) is released first by sliding the lock button 65 forward relative to the labeler unit with the thumb. When the label cassette 2 is thereafter lifted by hand, both the first engagement means (61, 62) and the third engagement means (51, 59) disengage, making complete removal of the label cassette 2 possible.

As explained in the foregoing, the present invention provides a simply configured retaining device for a labeler constituted or a labeler unit and a label cassette loadable in the labeler unit. Since, in addition to the first engagement means and the second engagement means or the prior art retaining device, the device according to this invention further provides the third engagement means constituted by the grip for moving the label lateral restriction section of the label cassette and the slotted engagement section provided on the labeler unit, it is able to prevent the label cassette from falling out of the labeler unit even when the operator uses the labeler roughly during rapid labeling. The retaining device also ensures the reliable lateral restraint of the label roll required for proper label peel-off and label feeding.

What is claimed is:

1. A labeler comprising:

a main body;

a label cassette for holding a roll of labels, the roll of labels comprising a label strip of separate labels and a continuous backing strip to which the labels are separably adhered;

label strip advancing means for advancing the label strip off the roll;

label removing means for engaging the label strip after it has left the roll and for removing the labels from the backing strip;

an outlet from the main body for labels removed from the backing strip; and a retainer on the label cassette for restricting lateral movement of and for guiding the label strip moving off the label roll and being adjustable for different width label strips, the retainer comprising:

a first side plate for engaging one side edge of the label strip;

a second side plate for engaging the other side edge of the label strip; the second side plate being movable toward or away from the first side plate for adjusting the space between the plates for guiding different width label strips; and a grip for moving the second side plate and for engaging a slot on the main body.

2. A labeler of claim 1, further comprising a grip connected with the second side plate for being operated for moving the second side plate.

3. The labeler of claim 1, further comprising means for adjusting the second plate to selected positions spaced from the first plate.

4. The labeler of claim 3, wherein the adjusting means comprising a grip connected with the second side plate for moving the second side plate.

5. The labeler of claim 3, further comprising a support plate in the body extending across the labeler along the direction between the first and second side plates and to which the grip and the second side plate are supported for movement of the grip and the second side plate toward and away from the first side plate.

6. The labeler of claim 3, further comprising a label roll cassette separately attached to the labeler body and on which the label roll, the side plates and the adjusting means are supported.

* * * * *